J. P. TAYLOR.
BICYCLE SUPPORT.
APPLICATION FILED MAR. 19, 1910.
969,920.
Patented Sept. 13, 1910.
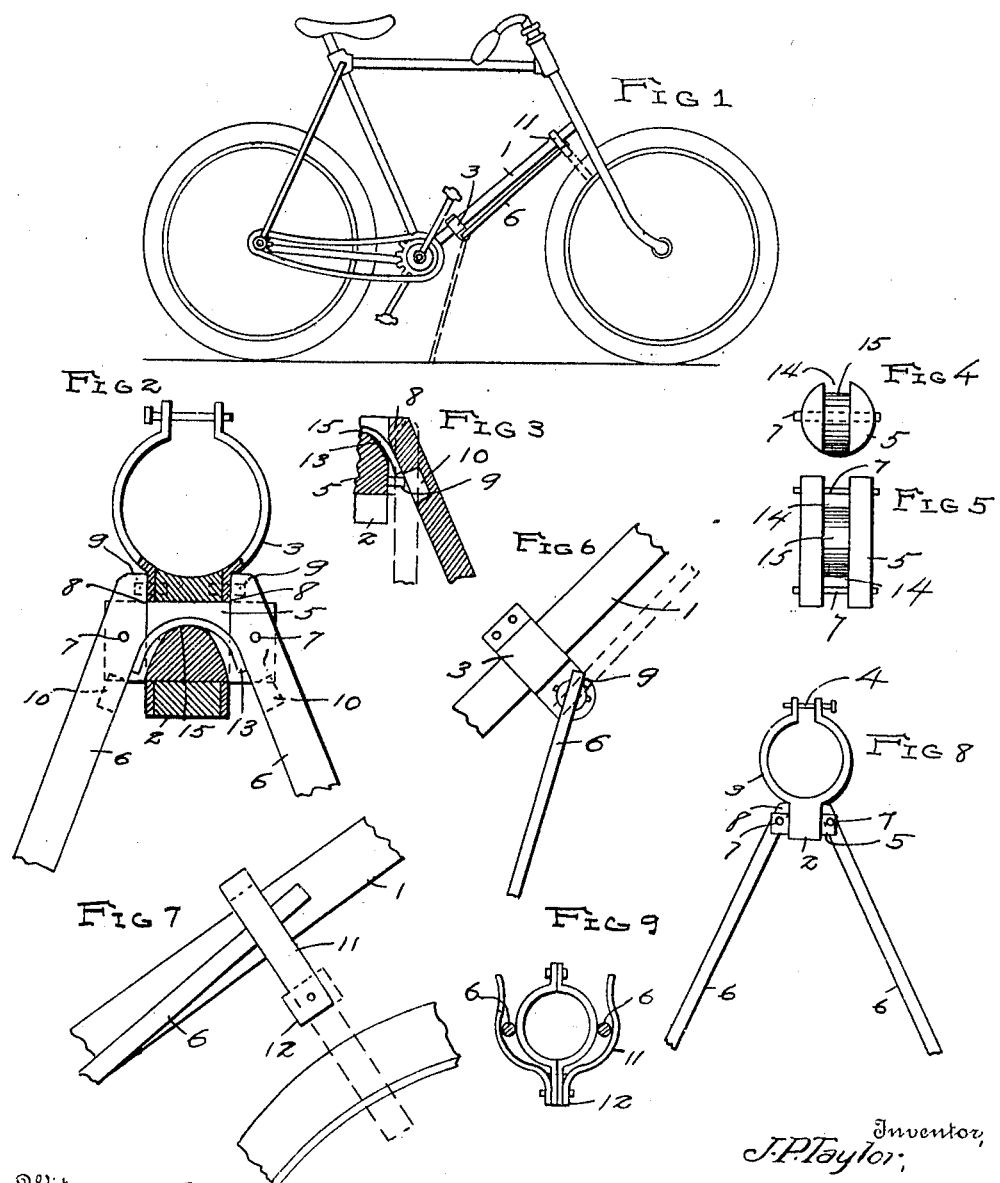
Witnesses
Geo. E. Simmonds
W. R. Joy.
Inventor,
J. P. Taylor,
By A. L. Jackson,
Attorney

UNITED STATES PATENT OFFICE.

JAMES POLK TAYLOR, OF LONGBEACH, CALIFORNIA, ASSIGNOR TO CYCLE SUPPORT COMPANY, OF LOS ANGELES, CALIFORNIA.

BICYCLE-SUPPORT.

969,920.  Specification of Letters Patent.  Patented Sept. 13, 1910.

Application filed March 19, 1910. Serial No. 550,475.

*To all whom it may concern:*

Be it known that I, JAMES P. TAYLOR, a citizen of the United States, residing at Longbeach, in the county of Los Angeles and State of California, have invented a new and Improved Bicycle-Support, of which the following is a specification.

My invention relates to a support for a bicycle for holding the bicycle in upright positions when not in use, and the objects are to provide a support which will brace the bicycle on both sides and in front and in the rear and which will also hold the front wheel in line with the rear wheel and to provide a support which will occupy the least possible space and which is composed of few parts and which can be folded up in a compact form when not in use.

Other objects and advantages will be fully explained in the following description and the invention will be more particularly pointed out in the claims.

Reference is had to the accompanying drawings which form a part of this application.

Figure 1 is a side elevation of a bicycle with the support applied in the folded position. Fig. 2 is a broken sectional view illustrating the spring for spreading the legs. Fig. 3 is a broken sectional view, illustrating the manner of locking the legs on the bearing block to prevent movement of the legs relative to the bearing block when the legs are folded. Fig. 4 is an end view of the pivot block or shaft. Fig. 5 is a plan view of the same. Fig. 6 is a detail view of the legs engaging the locking pins on the bearing block. Fig. 7 is a detail view of the clip for holding the legs in the folded position and for holding the front wheel in supporting position. Fig. 8 is a rear elevation of the supporting legs and bearing block. Fig. 9 is a rear elevation of the leg supporting clip.

Similar characters of reference are used to indicate the same parts throughout the several views.

The improved support is attached to the frame piece 1 of the bicycle. A bearing block 2 is carried by a clip 3 which is attached to the frame piece 1. The clip 3 is secured to the frame piece 1 by suitable bolts 4 and may be riveted to the block 2. The bearing block 2 has an opening therethrough to form a bearing or journal for the pivot block 5. The legs 6 are secured in the ends of the pivot block 5 by pivot pins 7 which extend through the legs and the block. The pivot block 5 has grooves in each end thereof to receive the legs 6 and these grooves are deep enough to permit the legs 6 to swing inwardly from the open position. The legs 6 swing laterally on the pins 7 and the legs swing forward or backward by the rocking of the pivot bolt in its bearing in the block 2. At their upper ends the legs 6 have beveled portions forming shoulders 8 which brace against the clip 3 and block 2 when supporting the bicycle. The upper parts of the legs 6 also brace against pins 9 inserted in the clip 3 and block 2 to prevent forward movement of the bicycle. The bicycle could not move forward when the legs are in supporting position without dragging the legs on the ground or other surface. The legs would brace the bicycle against going backward because the legs are inclined forward and friction of the legs against the ground or other surface would prevent the bicycle from going backward. The legs when folded are held against movement relative to the clip 3 and block 2 by the pins 9. The legs 6 have recesses 10 therein near the upper ends. When the legs are swung forward to be hung up when not in use, the recesses 10 will receive the pins 9 when the legs are drawn close together at their bottom ends. This will prevent the legs from further movement until opened again.

When the legs are not in use they are supported and carried on the frame piece 1 by reason of the attachment already described and also by the hooks 11. The hooks 11 may be formed of a single piece of steel or other metal. The two hooks are connected together by a loop 12 on the rear part of each hook. The legs 6 are spread open automatically when released from the hooks 11 by a spring 13. The spring 13 is mounted in a groove 14 which is continuous through the ends of the pivot block and on the upper side of this block, the groove wall in the block 5 being curved and that part of the block 5 about which the spring 13 lies is curved and forms a bearing 15 for the spring 13. The spring 13 is thus inclosed by the legs 6 and cannot be removed without taking out one of the legs. The spring and legs and other elements are thus arranged in compact form and cannot be easily disarranged and will not be in the way of the rider. The hooks 11 perform another function. When the legs 6 are taken down for supporting the bicycle, the hooks 11 may be swung down and engage the front wheel of the bicycle to hold the same in line with the rear wheel.

Having fully described my invention, what I claim as new and desire to secure by Letters Patent, is,—

1. A bicycle support comprising a bearing block attached to the frame of the bicycle, a pivot block mounted in said bearing block and having a groove in the ends thereof and the upper side thereof, legs pivotally attached to said pivot block and extending through the ends thereof and having shoulders projecting above said pivot block and adapted to engage said bearing block when the legs are in supporting position, a spring mounted in the groove in said pivot block and bearing against the said legs for spreading the same, and means for supporting the free ends of said legs when not in use.

2. A bicycle support comprising a bearing block attached to the frame of the bicycle, a pivot block mounted in said bearing block and having a continuous groove in the ends thereof and along the side thereof, supporting legs extending through the ends of said pivot block and pivotally attached thereto and extending above said pivot block and forming shoulders to engage said bearing block when in supporting position, a spring lying in said groove and bearing against the said legs to spread the same, and pins in said bearing block to engage the upper ends of said legs to prevent forward movement of the bicycle.

3. A bicycle support comprising a bearing block attached to the frame of the bicycle, legs pivotally attached to said bearing block, pins in said bearing block to engage said legs to prevent forward movement of the bicycle when the legs are in supporting position and to lock said legs against movement relative to said block when the legs are folded, and hooks attached to said frame to support the free ends of said legs when not in use, said legs having recesses to receive said pins when in the folded position.

4. A bicycle support comprising a bearing block attached to the lower front frame piece of the bicycle, legs pivotally attached to said bearing block, and hooks formed of a single piece of metal and pivotally attached to said frame piece for supporting the free ends of the legs when not in use and to be swung down to engage the front wheel of the bicycle when the legs are supporting the bicycle.

5. A bicycle support having a bearing block attached to the frame of the bicycle, a pivot block journaled in said bearing block and having a continuous groove in the ends and along the side thereof, legs extending through the ends of said pivot block, pivot pins extending through said block and through said legs, and a spring mounted in said groove and bearing against said legs and being inclosed by said legs and pivot block and bearing block for automatically spreading said legs to supporting position.

In testimony whereof, I set my hand in the presence of two witnesses, this 9th day of March, 1910.

JAMES POLK TAYLOR.

Witnesses:
P. W. KELLER,
A. C. PFAFFLE.